US011622509B2

(12) United States Patent
McClear

(10) Patent No.: US 11,622,509 B2
(45) Date of Patent: Apr. 11, 2023

(54) LIGHT SOURCE FOR PLANT CULTIVATION

(71) Applicant: SEOUL SEMICONDUCTOR CO., LTD., Ansan-si (KR)

(72) Inventor: Mark McClear, Ansan-si (KR)

(73) Assignee: SEOUL SEMICONDUCTOR CO., LTD., Ansan-si (KR)

( * ) Notice: Subject to any disclaimer, the term of this patent is extended or adjusted under 35 U.S.C. 154(b) by 0 days.

(21) Appl. No.: 17/713,918

(22) Filed: Apr. 5, 2022

(65) Prior Publication Data

US 2022/0225574 A1 Jul. 21, 2022

Related U.S. Application Data

(63) Continuation of application No. 16/506,731, filed on Jul. 9, 2019, now Pat. No. 11,304,376.

(60) Provisional application No. 62/850,122, filed on May 20, 2019.

(51) Int. Cl.
*A01G 7/04* (2006.01)
*A01G 9/20* (2006.01)
*H05B 45/20* (2020.01)

(52) U.S. Cl.
CPC .............. *A01G 7/045* (2013.01); *A01G 9/20* (2013.01); *H05B 45/20* (2020.01)

(58) Field of Classification Search
None
See application file for complete search history.

(56) References Cited

U.S. PATENT DOCUMENTS

| 10,440,900 B1* | 10/2019 | Higgins ................ H05B 47/19 |
| 2010/0020536 A1 | 1/2010 | Bafetti et al. |
| 2014/0340890 A1 | 11/2014 | Hata et al. |

(Continued)

FOREIGN PATENT DOCUMENTS

| CN | 106960899 | 7/2017 |
| EP | 3248456 | 11/2017 |
| JP | 2016-202108 | 12/2016 |

(Continued)

OTHER PUBLICATIONS

International Search Report for International Application PCT/KR2020/006607, dated Oct. 27, 2020.

(Continued)

*Primary Examiner* — Anh Q Tran
(74) *Attorney, Agent, or Firm* — Perkins Coie LLP

(57) ABSTRACT

A plant cultivation light source includes at least two light sources selected from first, second, and third light sources that emit first, second, and third lights, respectively. The first light has a first peak at a wavelength from about 400 nanometers to about 500 nanometers, the second light has a second peak appearing at a wavelength, which is longer than the first peak, from about 400 nanometers to about 500 nanometers, and the third light has a third peak appearing at a wavelength, which is shorter than the first peak, from about 400 nanometers to about 500 nanometers. The first light is a white light and has a first sub-peak having an intensity lower than an intensity of the first peak at a wavelength from about 500 nanometers to about 700 nanometers. The first sub-peak has a full-width at half-maximum greater than a full-width at half-maximum of the first peak.

18 Claims, 14 Drawing Sheets

(56) References Cited

U.S. PATENT DOCUMENTS

2018/0323351 A1 11/2018 Chen et al.
2020/0367442 A1 11/2020 McClear

FOREIGN PATENT DOCUMENTS

| JP | 2016202108 A | 12/2016 |
|----|---|---|
| KR | 10-2012-0088662 | 8/2012 |
| KR | 10-2016-0081470 | 7/2016 |
| KR | 10-2017-0090317 | 8/2017 |
| KR | 20170090317 A | 8/2017 |
| KR | 10-2019-0024223 | 3/2019 |
| WO | 2011/033177 | 3/2011 |

OTHER PUBLICATIONS

Office Action from corresponding Chinese Patent Application No. 2022112202521840, dated Nov. 25, 2022 (13 pages).
Supplementary European Search Report from related EP Application No. 20809408, dated Dec. 1, 2022 (8 pages).

* cited by examiner

LIGHT SOURCE FOR PLANT CULTIVATION

RELATED APPLICATION

This application is a continuation of U.S. patent application Ser. No. 16/506,731, filed on Jul. 9, 2019, which claims priority to U.S. Provisional Application No. 62/850,122, filed on May 20, 2019. The disclosures of the aforementioned applications are hereby incorporated by reference in their entireties.

BACKGROUND

1. Field of Disclosure

The present disclosure relates to a plant cultivation light source. More particularly, the present disclosure relates to a light source that emits a light optimized for plant photosynthesis.

2. Description of the Related Art

Various light sources, as an alternative to sunlight, are being developed and being used as lightings for plant cultivation. Conventionally, incandescent lamps and fluorescent lamps have been mainly used as the lightings for plant cultivation. However, the conventional lightings for plant cultivation do not adequately provide plants with light having a wavelength band necessary for plant photosynthesis.

In recent years, an LED is used as lighting devices for plant cultivation, however, there are problems in using the LED, such as having a spectrum limited to a specific wavelength or consuming excessive energy and cost to provide a sufficient amount of light to the plants.

SUMMARY

Embodiments of the present disclosure provide a plant cultivation light source including at least two light sources selected from first, second, and third light sources respectively emitting first, second, and third lights. The first light has a first peak at a wavelength from about 400 nanometers to about 500 nanometers. The second light has a second peak appearing at a wavelength, which is longer than the first peak, from about 400 nanometers to about 500 nanometers. The third light has a third peak appearing at a wavelength, which is shorter than the first peak, from about 400 nanometers to about 500 nanometers. The first light is a white light and has a first sub-peak having an intensity lower than an intensity of the first peak at a wavelength from about 500 nanometers to about 700 nanometers. The first sub-peak has a full-width at half-maximum greater than a full-width at half-maximum of the first peak.

An overlap area between a spectrum of the light emitted from the light source and a spectrum defined by a McCree curve is equal to or greater than about 50% of the spectrum defined by the McCree curve.

The second light has a second sub-peak at a wavelength from about 500 nanometers to about 600 nanometers, and an intensity of the second sub-peak is higher than the first sub-peak.

The third light has a third sub-peak at a wavelength from about 500 nanometers to about 600 nanometers, and an intensity of the third sub-peak is higher than the first sub-peak.

The light source further includes a fourth light source that emits a fourth light having a fourth peak at a wavelength from about 600 nanometers to about 700 nanometers.

At least one of the first to fourth light sources is provided in a plural number.

The first light has a color temperature of about 5000K.

According to embodiments, a plant cultivation light source module employs the light source. The plant cultivation light source module includes the light source emitting a light in a visible light wavelength band according to the embodiments, a controller controlling the light source, and a power supply supplying a power to at least one of the light source and the controller.

According to embodiments, the light source is employed in a plant cultivation device, and the plant cultivation device includes the light source module according to the embodiments and a housing in which the light source module is installed.

According to the above, the light source according to the above-mentioned embodiments may be used to provide the light to the plants and to cultivate the plants. The light source may provide the light having the spectrum that is optimal for the photosynthesis of the plants. The spectrum of the mixed light obtained by mixing two or more lights of the first to fourth lights maximizes the area where the spectrum of the mixed light overlaps the McCree curve, and thus the light efficiency may remarkably increase. Thus, it is possible to efficiently grow the plants with a small number of light sources, and energy and cost may be reduced.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION OF EMBODIMENTS

Figure 1:
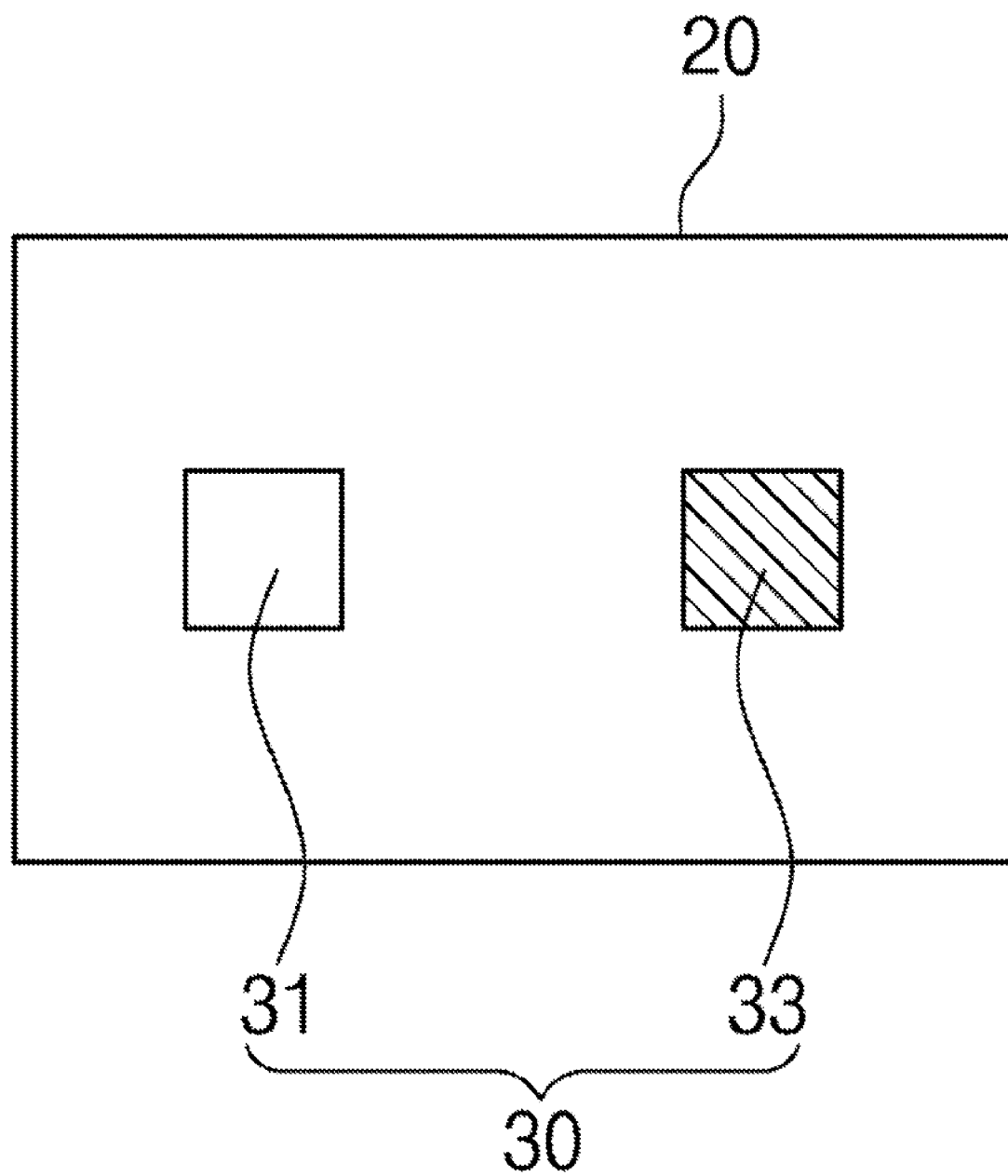
FIG. 1 is a plan view showing a plant cultivation light source according to an exemplary embodiment of the present disclosure.

The present disclosure may be variously modified and realized in many different forms, and thus specific embodiments will be exemplified in the drawings and described in detail hereinbelow. However, the present disclosure should not be limited to the specific disclosed forms, and be construed to include all modifications, equivalents, or replacements included in the spirit and scope of the present disclosure.

Like numerals refer to like elements throughout. In the drawings, the thickness, ratio, and dimension of components are exaggerated for effective description of the technical content. It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure. As used herein, the singular forms, "a", "an" and "the" are intended to include the plural forms as well, unless the context clearly indicates otherwise.

It will be further understood that the terms "comprises" and/or "comprising", or "includes" and/or "including", when used in this specification, specify the presence of stated features, integers, steps, operations, elements, and/or components, but do not preclude the presence or addition of one or more other features, integers, steps, operations, elements, components, and/or groups thereof.

The present disclosure relates to a light source used to cultivate plants.

Plants photosynthesize using a light in a visible light wavelength band and gain energy through photosynthesis. Photosynthesis of plants does not occur to the same extent in all wavelength bands. The light in a specific wavelength band that plants use for photosynthesis in sunlight is called Photosynthetic Active Radiation (PAR), occupies a portion of solar spectrum, and corresponds to a band from about 400 nanometers to about 700 nanometers.

Figure 2:
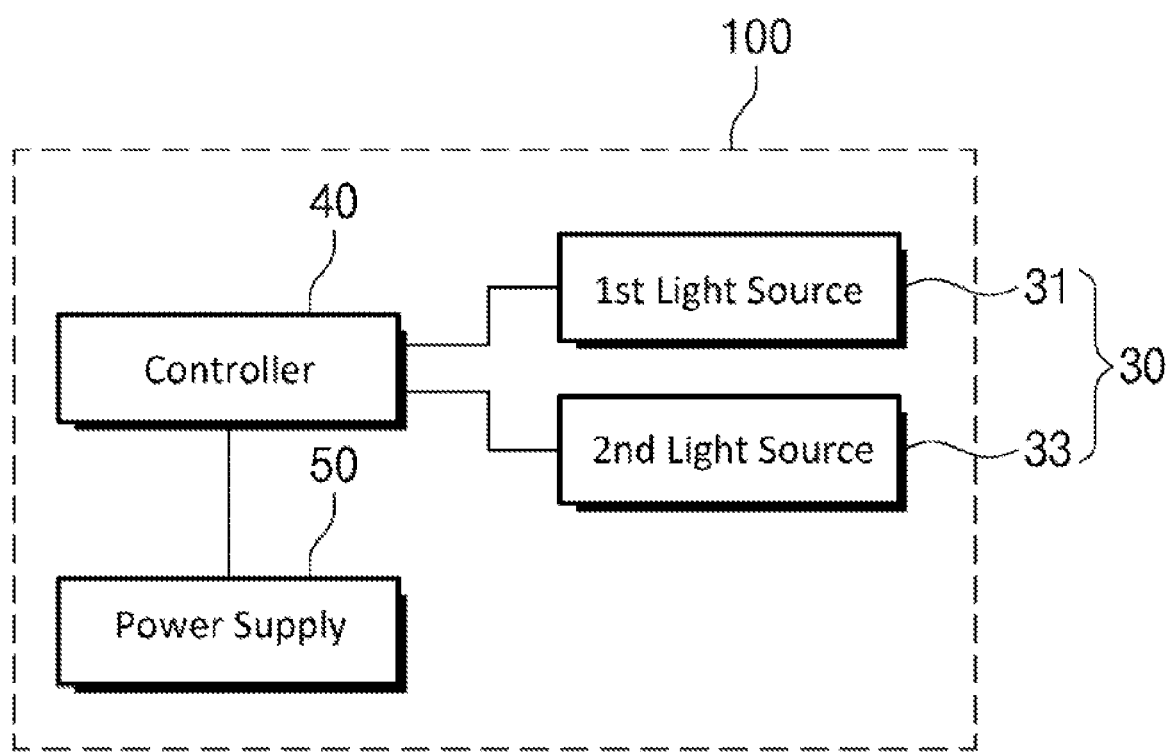
FIG. 2 is a block diagram showing a plant cultivation light source module according to an exemplary embodiment of the present disclosure.

FIG. 1 is a plan view showing a plant cultivation light source according to an exemplary embodiment of the present disclosure, and FIG. 2 is a block diagram showing a plant cultivation light source module according to an exemplary embodiment of the present disclosure.

Referring to FIGS. 1 and 2, a plant cultivation light source module 100 includes a light source 30 emitting a light that plants need, a controller 40 controlling the light source 30, and a power supply 50 supplying a power to the light source 30 and/or the controller 40. The light source 30 may include first and second light sources 31 and 33 emitting a light in a visible light wavelength band and having a spectrum peak in different wavelengths from each other.

The first light source 31 and the second light source 33 may be disposed on a substrate 20. The substrate may be a printed circuit board on which wirings and circuits are formed to allow the first light source 31 and the second light source 33 to be directly mounted thereon, however, the substrate should not be limited to the printed circuit board. The shape and the structure of the substrate should not be particularly limited as long as the first light source 31 and the second light source 33 are mounted on the substrate, and the substrate may be omitted.

In the exemplary embodiment of the present disclosure, the controller 40 is connected to the first and/or second light sources 31 and 33 to control whether to operate or not the first light source 31 and the second light source 33. The controller 40 may be connected to the first and/or second light sources 31 and 33 by wire or wirelessly. The controller 40 is connected to the power supply 50 that supplies the power to the controller 40. The power supply 50 may be connected to the light source via the controller 40, or may be directly connected to the light source to supply the power to the light source.

The controller 40 may control ON/OFF of the first light source 31 and/or the second light source 33 such that the first light source 31 and the second light source 33 emit the lights at a predetermined intensity for a predetermine period. The first light source 31 and the second light source 33 may be individually operated such that the plants carry out photosynthesis with a maximum efficiency. The controller 40 may independently control an emission intensity or an emission time of a first light L1 and a second light L2. In addition, when the first light source 31 and/or the second light source 33 include a plurality of light emitting diodes, the individual light emitting diodes may be independently controlled.

In the exemplary embodiment of the present disclosure, when the first and second light sources 31 and 33 include plural light emitting diodes, a composition ratio of the light emitting diodes may differ in various ways. For example, the number of the second light sources 33 may be smaller or larger than the number of the first light sources 31. The number of the light emitting diodes of the first and second light sources 31 and 33 may be determined according to the type of plants. For instance, the composition ratio may vary depending on a ratio of cryptochrome that is a blue light receptor to phytochrome that is a red light receptor. Accordingly, the light emitting diodes provided in the first and second light sources 31 and 33 may irradiate the lights customized to the type of plants. Therefore, plants may grow faster and bigger with less power.

In addition, the controller 40 may control the operation of the first light source 31 and the second light source 33 according to a preset process or according to a user's input. The operation of the first light source 31 and the second light source 33 may be changed in various ways depending on the type of plants and the growth stage of plants.

According to the exemplary embodiment of the present disclosure, when the plant cultivation light source is used, it is possible to independently provide a growing environment suitable for the types of plants even under conditions in which the sunlight is insufficient or the sunlight is not provided. In addition, plants with enhanced photosynthetic capacity may be easily grown in large quantities.

Figure 3A:
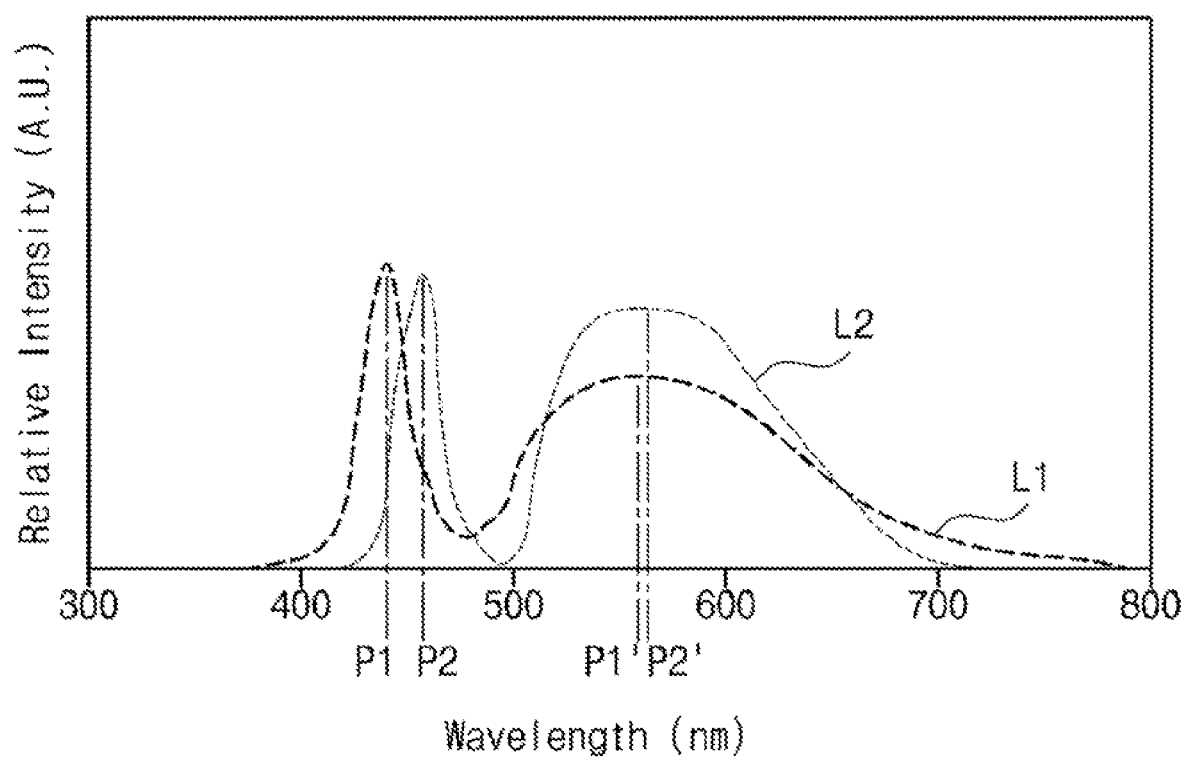
FIG. 3A is a graph showing spectra of lights respectively emitted from a first light source and a second light source in the light source according to an exemplary embodiment of the present disclosure.
Figure 3B:
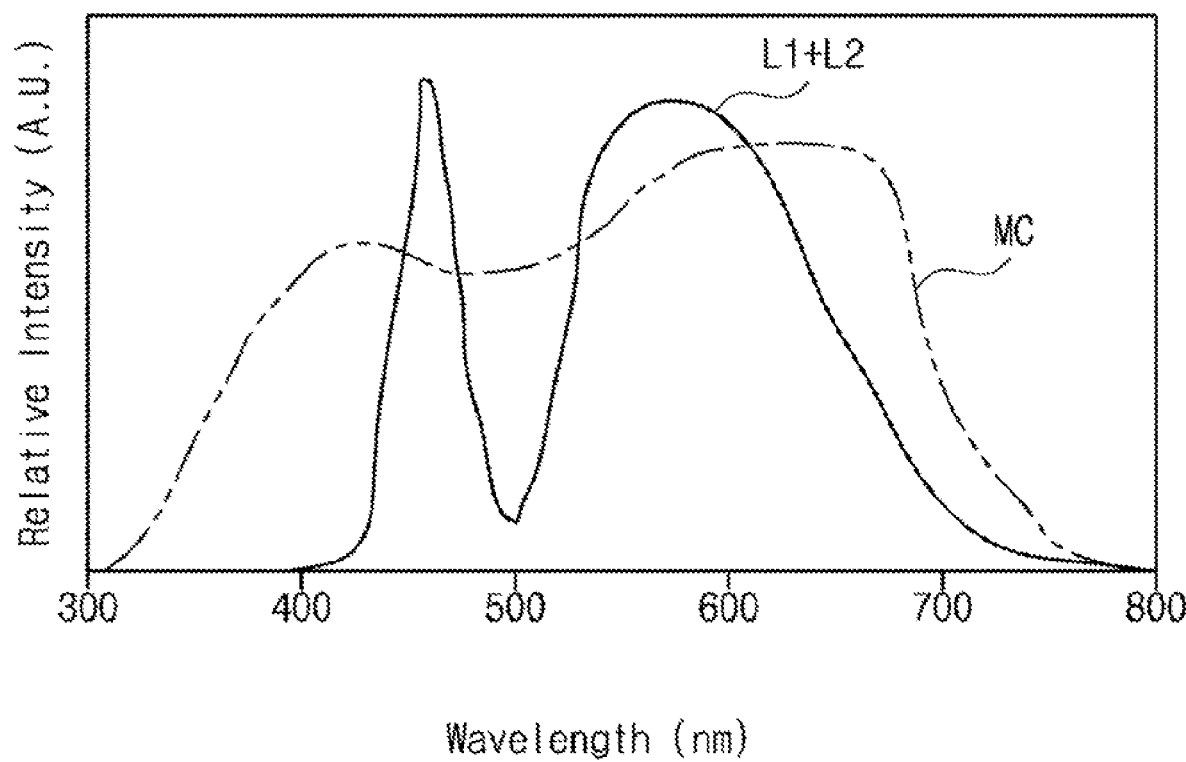
FIG. 3B is a graph showing a spectrum of a light obtained by mixing the lights respectively emitted from the first light source and the second light source and a spectrum of the McCree curve.

FIG. 3A is a graph showing spectra of lights respectively emitted from the first light source 31 and the second light source 33 according to an exemplary embodiment of the present disclosure, and FIG. 3B is a graph showing a spectrum of a light obtained by mixing the lights respectively emitted from the first light source 31 and the second light source 33 and a spectrum of the McCree curve.

Referring to FIGS. 3A and 3B, the first light source 31 emits the first light L1 in a first wavelength band, and the second light source 33 emits the second light L2 in a second wavelength band.

Both the first light source 31 and the second light source 33 emit lights in a wavelength band used for photosynthesis. The wavelength band used for photosynthesis is within a range from about 400 nanometers to about 700 nanometers. The light source according to an exemplary embodiment of the present disclosure provides a light having a plant lighting efficiency equal to, or greater than about 3.1 μmols/J to the plants.

The first light L1 corresponds to a white light. In the present exemplary embodiment of the present disclosure, the first light L1 may be a light whose color temperature is about 5000K and may be a light having the color temperature higher or lower than about 5000K. In the present exemplary embodiment of the present disclosure, the first light L1 has a first peak P1 at a wavelength from about 400 nanometers to about 500 nanometers and has a first sub-peak P1' at a wavelength from about 500 nanometers to about 700 nanometers. The first peak P1 may appear at a wavelength from about 400 nanometers to about 470 nanometers, e.g., at a wavelength from about 430 nanometers to about 460 nanometers. The first sub-peak P1' may appear at a wavelength from about 540 nanometers to about 600 nanometers.

The first peak P1 has the highest intensity in the spectrum of the first light L1, and the first sub-peak P1' has an intensity lower than that of the first peak P1. A full-width at half-maximum of the first peak P1 is narrower than a full-width at half-maximum of the first sub-peak P1'.

The second light L2 has a second peak P2 at a wavelength from about 400 nanometers to about 500 nanometers and has a second sub-peak P2' at a wavelength from about 500 nanometers to about 700 nanometers. The second peak P2 may appear at a wavelength from about 450 nanometers to about 500 nanometers, e.g., at a wavelength of about 480 nanometers. The second sub-peak P2' may appear at a wavelength from about 540 nanometers to about 610 nanometers.

The second peak P2 has the highest intensity in the spectrum of the second light L2, and the second sub-peak P2' has an intensity lower than that of the second peak P2. A full-width at half-maximum of the second peak P2 is narrower than a full-width at half-maximum of the second sub-peak P2'.

The second peak P2 appears at a wavelength longer than the first peak P1, and the second sub-peak P2' appears at a wavelength band similar to the first sub peak P1'. The intensity of the first peak P1 and the intensity of the second peak P2 may be similar to each other. The first peak P1 and the second peak P2 correspond to the blue light. In the present exemplary embodiment, since the first peak P1 and the second peak P2 do not appear at the same wavelength, the blue light of too high intensity may be prevented from being provided to the plants when the first light L1 and the second light L2 are combined with each other.

The second sub-peak P2' may be emitted at an intensity higher than that of the first sub-peak P1'. In this case, a height of the second sub-peak P2' may be higher than a height of the first sub-peak P1'. The second sub-peak P2' lies from a green color to a yellow color and a portion of a red color. Wavelength bands that are relatively effective for photosynthesis correspond to blue and red colors: however, visible light wavelength bands corresponding to other colors between the blue color and the red color may also affect photosynthesis. For example, various pigments in plants, such as carotenoids, may absorb lights in wavelength bands that are not absorbed by chlorophyll, thereby dispersing the lights and preventing chlorophyll from being destroyed. In addition, since an absorption spectrum of chlorophyll does not completely coincide with an action spectrum of a leaf, photosynthesis occurs to some extent even in the green light not absorbed by chlorophyll. In the exemplary embodiment of the present disclosure, as a spectrum corresponding to the green color to the red color is augmented by the second sub-peak P2' of the second light L2, photosynthetic efficiency of plants for a variety of lights may be improved.

The spectrum of the first light L1 has a valley between the first peak P1 and the first sub-peak P1', and the spectrum of the second light L2 has a valley between the second peak P2 and the second sub-peak P2'. In the spectrum of the first light L1 and the spectrum of the second light L2, positions of two valleys do not match with each other, and thus the light may be sufficiently provided to the plants in a region corresponding to the valley when the two lights are combined with each other.

The light source of the present disclosure emits a light having a spectrum whose area overlaps a spectrum known as the McCree curve by about 50% or more due to the combination of the first light L1 and the second light L2. The McCree curve spectrum shows a light in a wavelength range required for optimal growth of plants.

According to the McCree curve MC, the wavelength band of the light required for photosynthesis of plants is evenly distributed in a range of about 400 nanometers to about 700 nanometers. Therefore, even when using artificial lighting such as LEDs, there is a need to provide a light having a uniform intensity distribution in the wavelength band from about 400 nanometers to about 700 nanometers.

In the case of conventional lightings for plants, it was common for LEDs to provide a high intensity of light in a single wavelength band with a narrow full-width at half-maximum rather than emitting a light in an entire wavelength band. For example, the conventional lightings for plants often used a red light source and a blue light source, which emit a red light at a wavelength of about 660 nanometers and a blue light at a wavelength of about 450 nanometers, respectively, and are believed to be mainly used for photosynthesis. As another way, the conventional lightings for plants mainly used a light source obtained by mixing white light sources respectively having color temperatures of about 5000K and 3000K, and a light source of a red wavelength band was further used. However, in the case of the conventional lightings for plants, it was difficult to provide photons to plants in the entire wavelength band corresponding to the McCree curve, and as a result, the photosynthetic efficiency was not high.

The lightings according to the exemplary embodiment of the present disclosure provide the light that best matches the McCree curve using lightings having different spectra from each other, and particularly, a light source that emits a light of a spectrum having an area overlap ratio of at least 50% or at least 70% is provided.

In an exemplary embodiment of the present disclosure, the light source may be implemented in various ways. As an example, the light source may be implemented by using light emitting diodes.

In an exemplary embodiment of the present disclosure, the spectrum of the light source for providing the light corresponding to the McCree curve may be set differently from the above-described embodiment.

Figure 4:
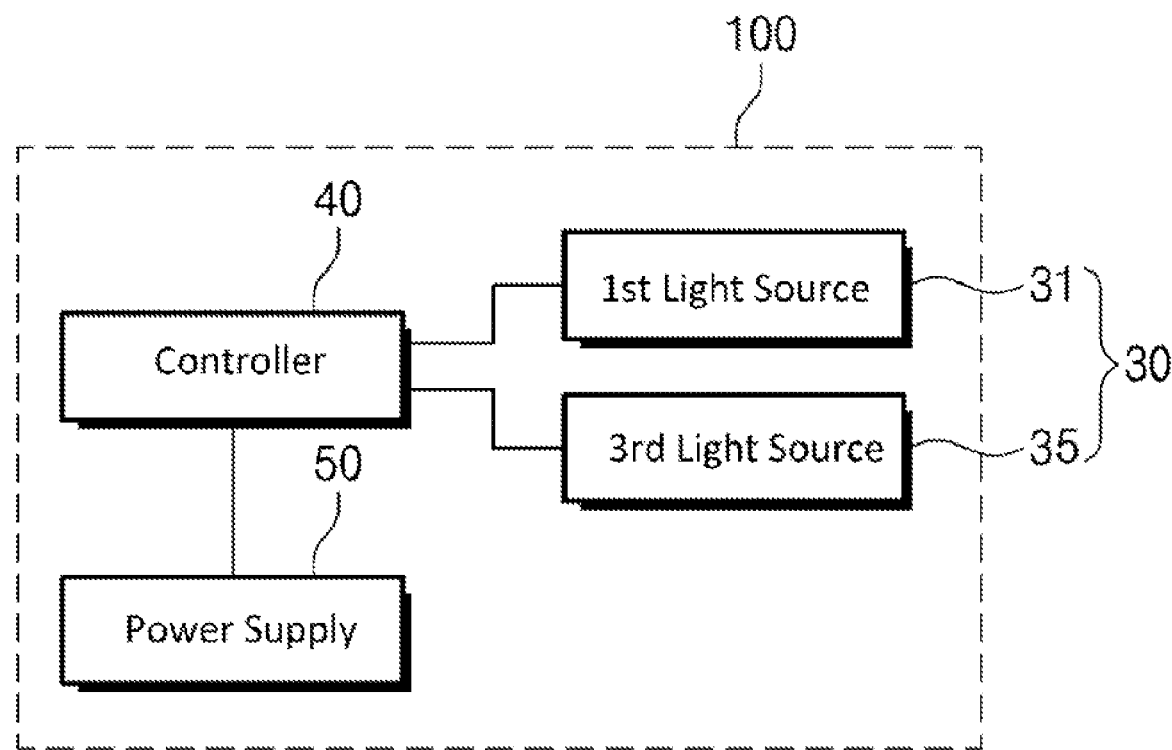
FIG. 4 is a block diagram showing a plant cultivation light source module according to an exemplary embodiment of the present disclosure.

FIG. 4 is a block diagram showing a plant cultivation light source module 100 according to an exemplary embodiment of the present disclosure.

Figure 5A:
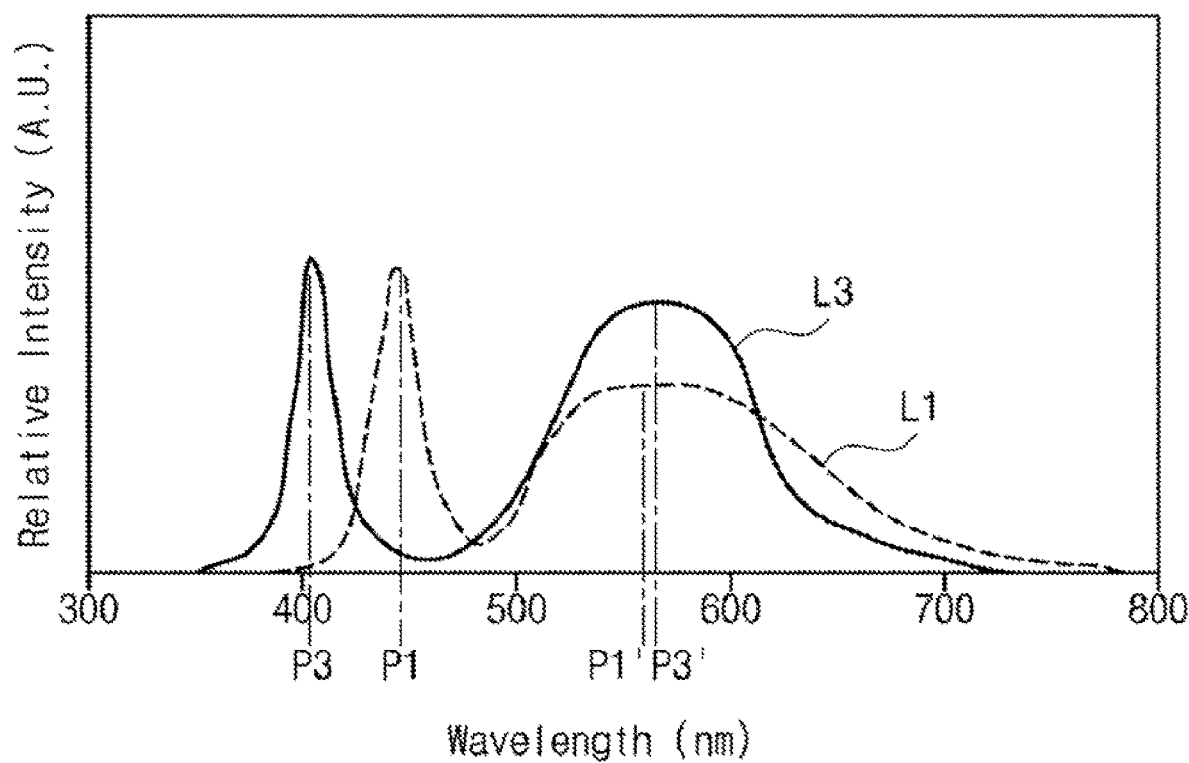
FIG. 5A is a graph showing a spectrum of a light from a plant cultivation light source of FIG. 4.
Figure 5B:
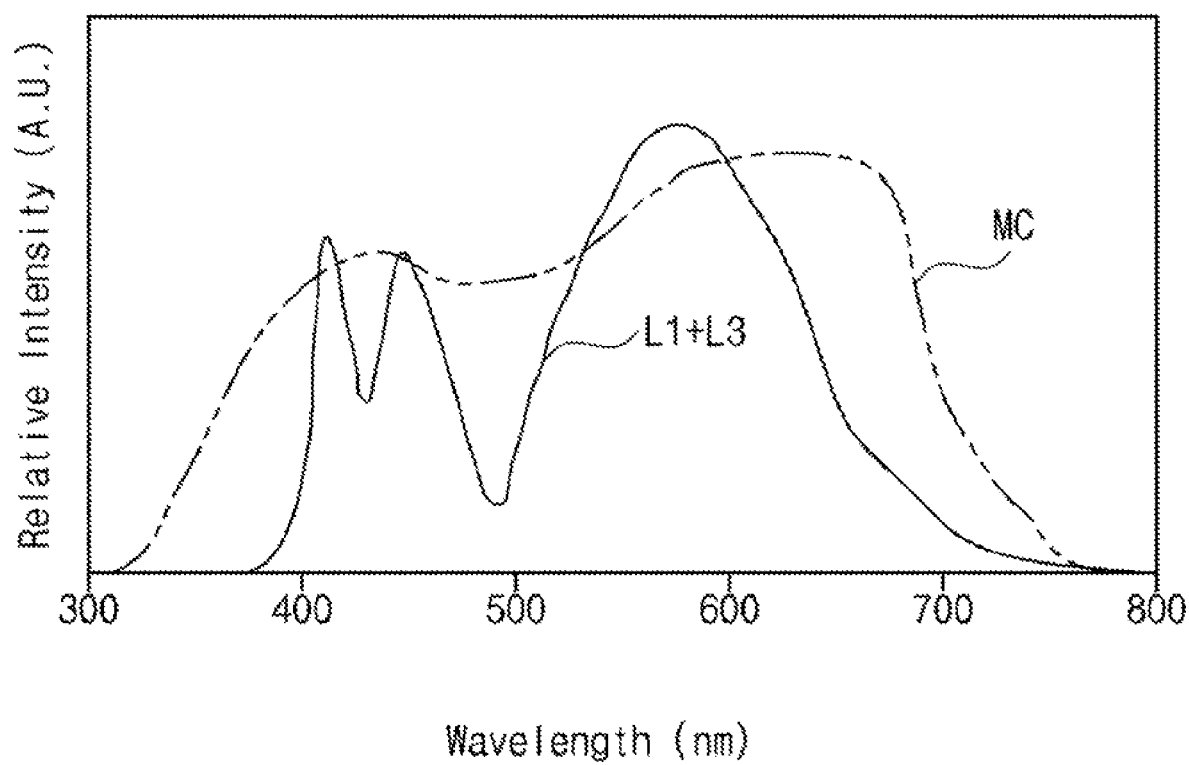
FIG. 5B is a graph showing a spectrum of a light obtained by mixing lights respectively emitted from a first light source and a third light source and a spectrum of the McCree curve.

FIG. 5A is a graph showing a spectrum of a light from a plant cultivation light source of FIG. 4, and FIG. 5B is a graph showing a spectrum of a light obtained by mixing lights respectively emitted from a first light source and a third light source and a spectrum of the McCree curve.

Referring to FIGS. 4, 5A, and 5B, the plant cultivation light source module 100 includes a light source 30 including a first light source 31 and a third light source 35, a controller 40, and a power supply 50.

In the present exemplary embodiment, both the first light source 31 and the third light source 35 emit lights in a wavelength band used for photosynthesis. The first light source 31 emits a first light L1, and the third light source 35 emits a third light L3.

The first light L1 corresponds to a white light. In the present exemplary embodiment of the present disclosure, the first light L1 may be a light whose color temperature is about 5000K and may be a light having the color temperature higher or lower than about 5000K. In the present exemplary embodiment of the present disclosure, the first light L1 has a first peak P1 at a wavelength from about 400 nanometers to about 500 nanometers and has a first sub-peak P1' at a wavelength from about 500 nanometers to about 700 nanometers. The first peak P1 may appear at a wavelength from about 400 nanometers to about 470 nanometers, e.g., at a wavelength from about 430 nanometers to about 460 nanometers. The first sub-peak P1' may appear at a wavelength from about 540 nanometers to about 600 nanometers.

The first peak P1 has the highest intensity in the spectrum of the first light L1, and the first sub-peak P1' has an intensity lower than that of the first peak P1. A full-width at half-maximum of the first peak P1 is narrower than a full-width at half-maximum of the first sub-peak P1'.

The third light L3 has a third peak P3 at a wavelength from about 400 nanometers to about 500 nanometers and has a third sub-peak P3' at a wavelength from about 500 nanometers to about 700 nanometers. The third peak P3 may appear at a wavelength from about 400 nanometers to about 460 nanometers, e.g., at a wavelength of about 410 nanometers. The third sub-peak P3' may appear at a wavelength from about 500 nanometers to about 550 nanometers.

The third peak P3 has the highest intensity in the spectrum of the third light L3, and the third sub-peak P3' has an intensity lower than that of the third peak P3. A full-width at half-maximum of the third peak P3 is narrower than a full-width at half-maximum of the third sub-peak P3'.

The third peak P3 appears at a wavelength shorter than that of the first peak P1, and the third sub-peak P3' appears at a wavelength band similar to that of the first sub-peak P3'. The intensity of the first peak P1 and the intensity of the third peak P3 may be similar to each other.

In the present exemplary embodiment, since the first peak P1 and the third peak P3 do not appear at the same wavelength, the blue light of too high intensity may be prevented from being provided to the plants when the first light L1 and the third light L3 are combined with each other.

The third sub-peak P3' may be emitted at an intensity higher than that of the first sub-peak P1'. In this case, a height of the third sub-peak P3' may be higher than a height of the first sub-peak P1'.

The third sub-peak P3' lies from a green color to a yellow color and has a wavelength band closer to the green color.

As a spectrum corresponding to the green color to the yellow color is augmented by the third sub-peak P3' of the third light L3, the photosynthetic efficiency of plants for a variety of lights may be improved.

The spectrum of the first light L1 has a valley between the first peak P1 and the first sub-peak P1', and the spectrum of the third light L3 has a valley between the third peak P3 and the third sub-peak P3'. In the spectrum of the first light L1 and the spectrum of the third light L3, positions of two valleys do not match with each other, and thus sufficient light may be provided to the plants in a region of the spectrum corresponding to the valley as the two lights are combined with each other.

The lightings according to the exemplary embodiment of the present disclosure provide the light that best matches the McCree curve using lights having different spectra from each other, and particularly, the lightings provide a light of a spectrum having an area overlap ratio of at least 50% or at least 70%.

In an exemplary embodiment of the present disclosure, the spectrum of the light source for providing the light corresponding to the McCree curve may be set differently from the above-described embodiment, and a light source with a different wavelength may be additionally combined.

Figure 6:
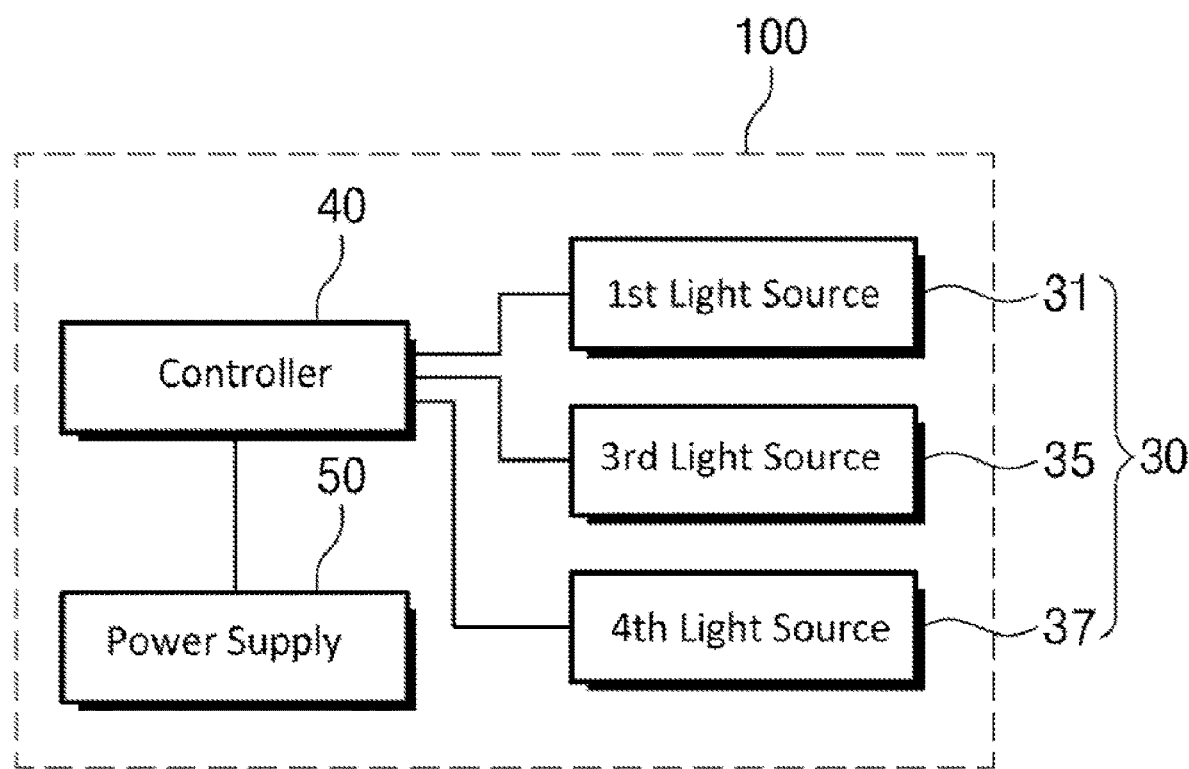
FIG. 6 is a block diagram showing a plant cultivation light source module according to an exemplary embodiment of the present disclosure.

FIG. 6 is a block diagram showing a plant cultivation light source module 100 according to an exemplary embodiment of the present disclosure.

Figure 7A:
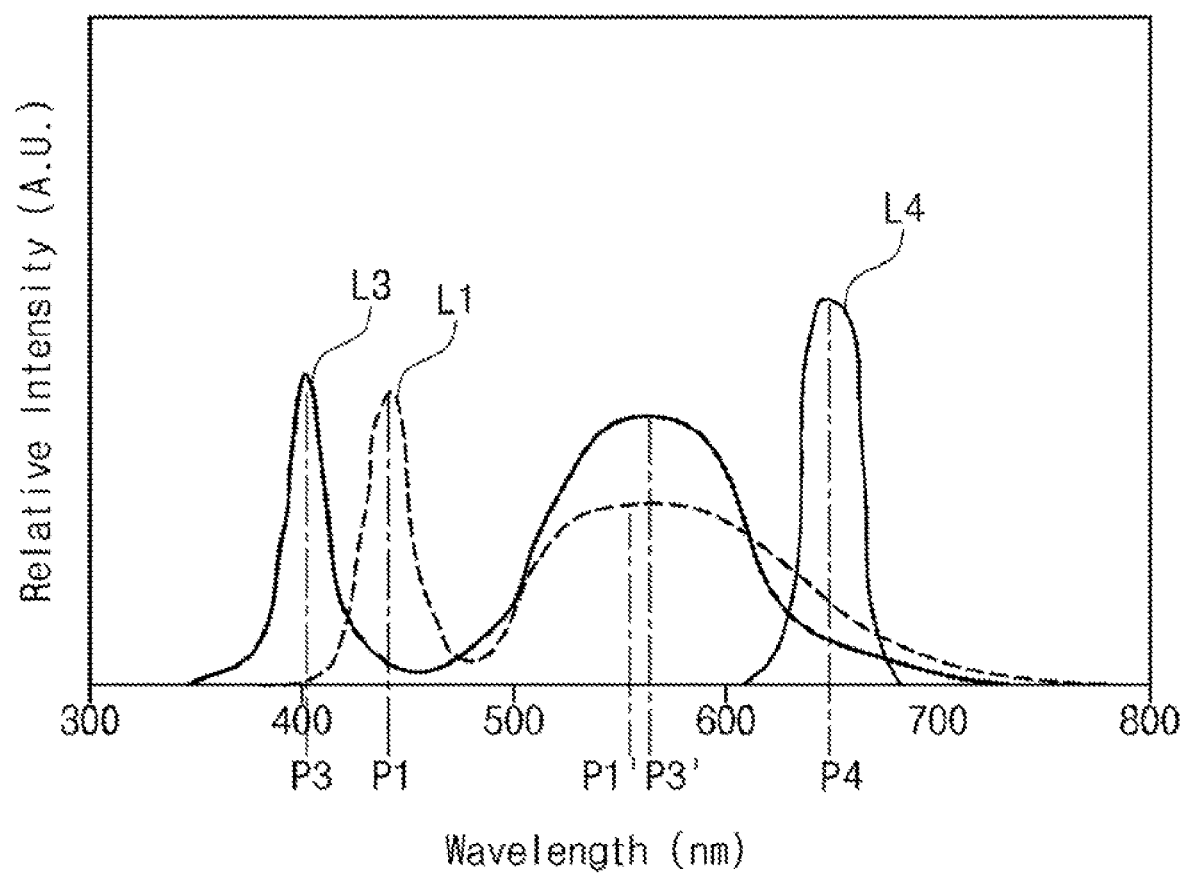
FIG. 7A is a graph showing a spectrum of a light from a plant cultivation light source of FIG. 6.
Figure 7B:
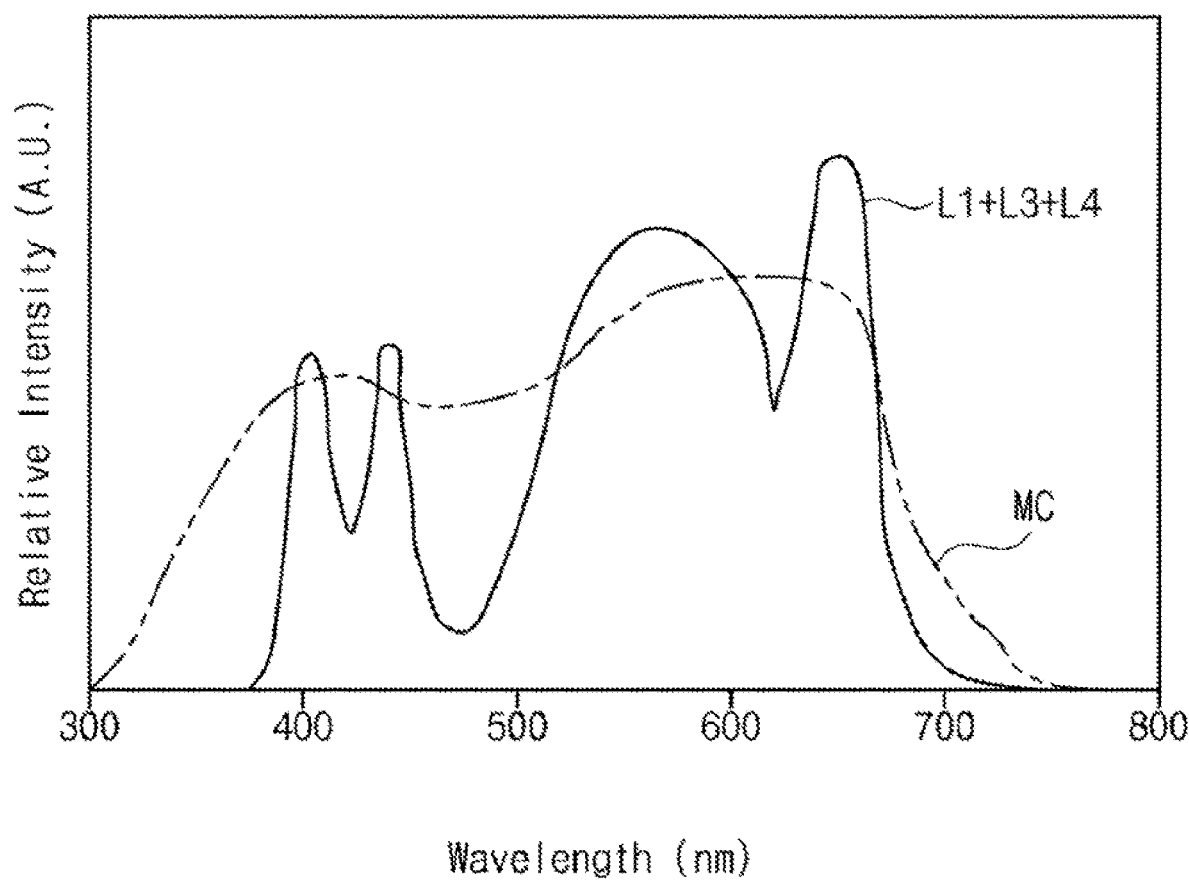
FIG. 7B is a graph showing a spectrum of a light obtained by mixing lights respectively emitted from first, second, and third light sources and a spectrum of the McCree curve.

FIG. 7A is a graph showing a spectrum of a light from a plant cultivation light source of FIG. 6, and FIG. 7B is a graph showing a spectrum of a light obtained by mixing lights respectively emitted from first, second, and third light sources and a spectrum of the McCree curve.

Referring to FIGS. 6, 7A, and 7B, the plant cultivation light source module includes a first light source 31, a third light source 35, a fourth light source 37, a controller 40, and a power supply 50.

The first light source 31 and the third light source 35 may be substantially the same as the first and third light sources 31 and 35 respectively shown in FIGS. 2 and 4.

According to the present exemplary embodiment, the fourth light source 37 emits a fourth light L4 having a fourth peak P4 appearing at a wavelength from about 600 nanometers to about 700 nanometers. A peak of the fourth light L4 is located in a wavelength band corresponding to a red color. As a light corresponding to the red color is augmented to an entire spectrum by the fourth light L4 from the fourth light source 37, the photosynthetic efficiency of plants for a variety of lights may improve. The fourth light source 37 may have a peak in a range from about 640 nanometers to about 680 nanometers, for example, the fourth peak P4 at a wavelength of about 660 nanometers.

The lightings from the light sources according to the exemplary embodiment of the present disclosure provide the light that best matches the McCree curve using lights having different spectra from each other, and particularly, the lightings from the light sources provide a light of a spectrum having an area overlap ratio of at least 50%, at least 70%, or at least about 809%.

Figure 8:
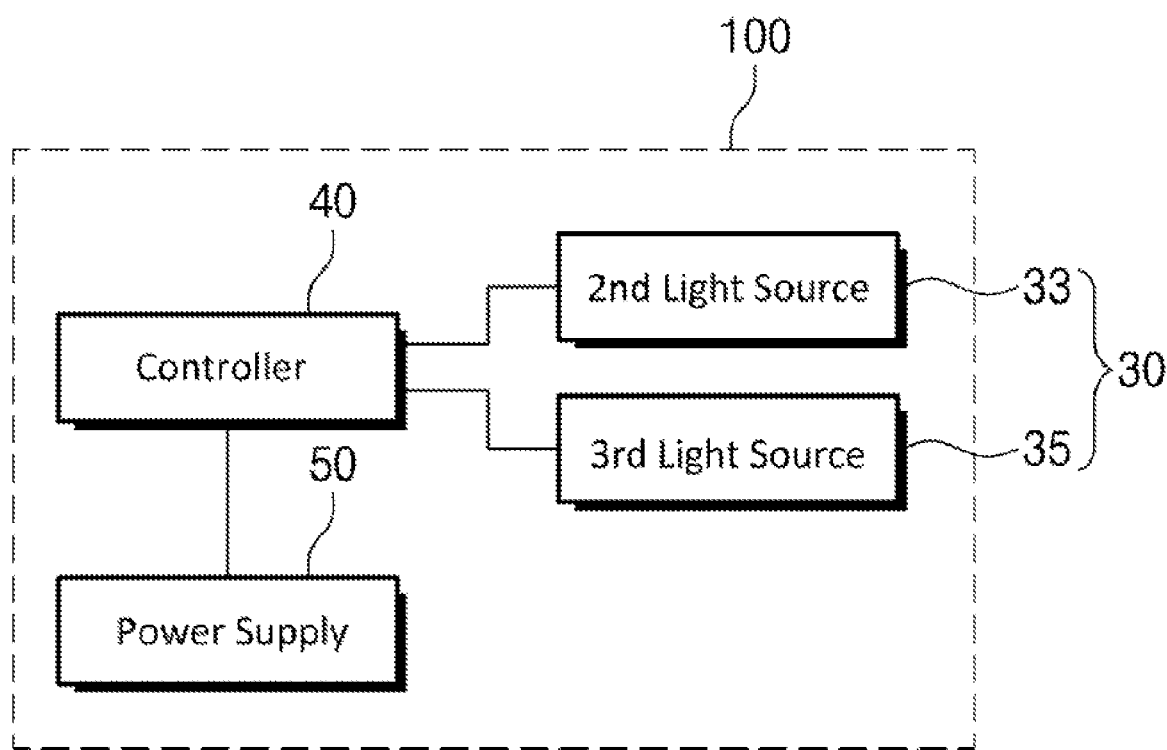
FIG. 8 is a block diagram showing a plant cultivation light source module according to an exemplary embodiment of the present disclosure.
Figure 9A:
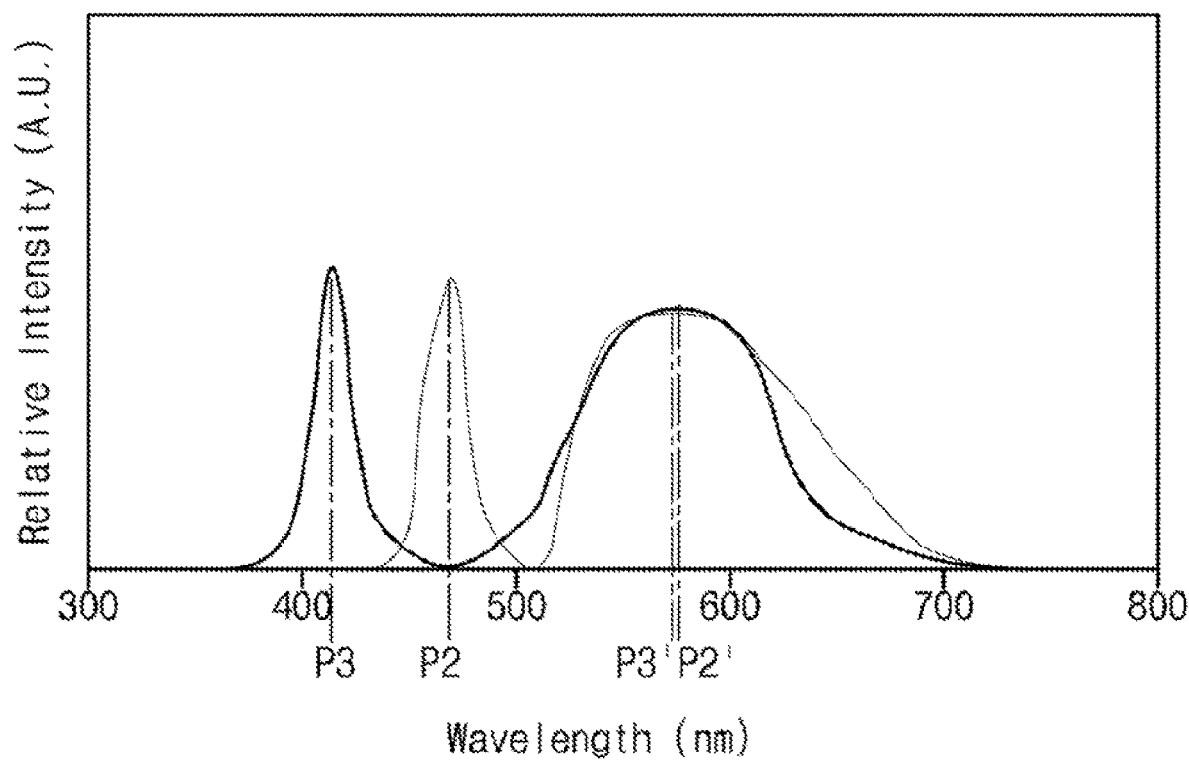
FIG. 9A is a graph showing a spectrum of a light from a plant cultivation light source of FIG. 8.

FIG. 8 is a block diagram showing a plant cultivation light source module 100 according to an exemplary embodiment of the present disclosure. FIG. 9A is a graph showing a spectrum of a light from a plant cultivation light source of FIG. 8, and FIG. 9B is a graph showing a spectrum of a light obtained by mixing lights respectively emitted from second and third light sources and a spectrum of the McCree curve.

Figure 9B:
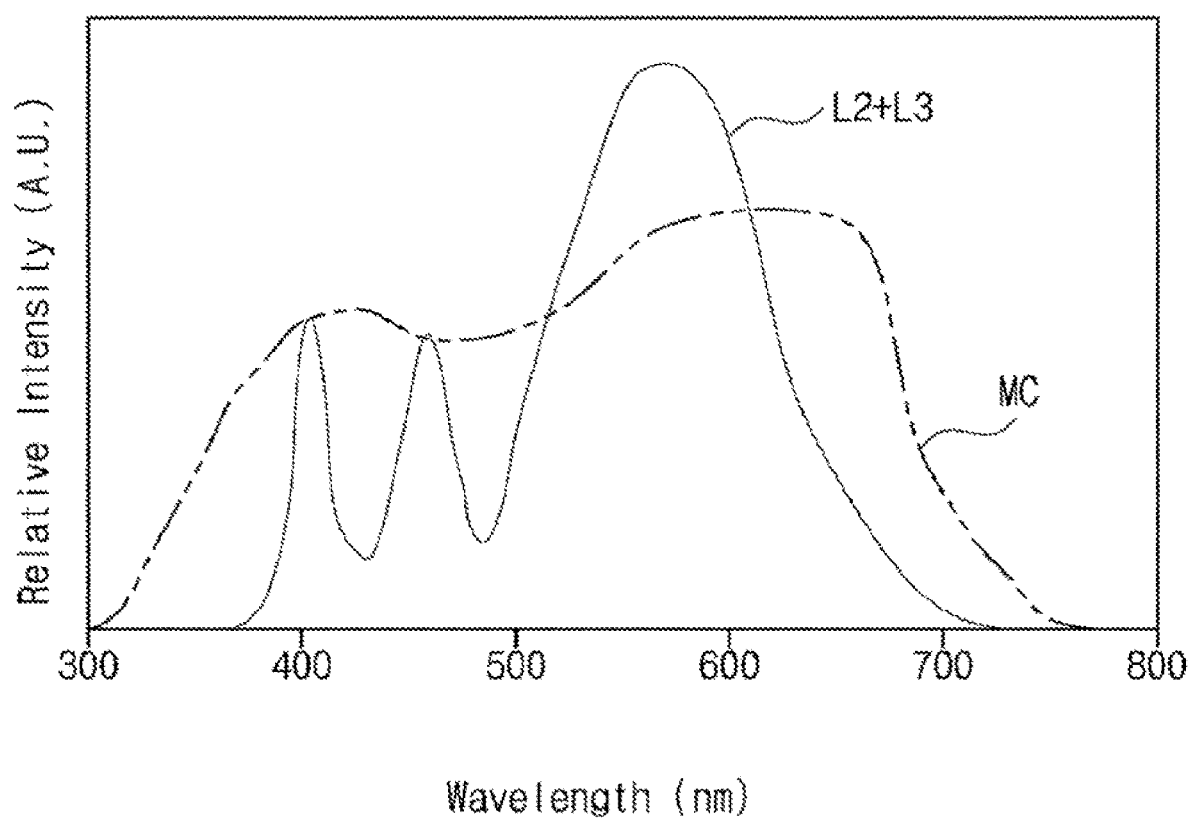
FIG. 9B is a graph showing a spectrum of a light obtained by mixing lights respectively emitted from second and third light sources and a spectrum of the McCree curve.

Referring to FIGS. 8, 9A, and 9B, the plant cultivation light source module includes a second light source 33, a third light source 35, a controller 40, and a power supply 50.

The second light source 33 and the third light source 35 may be substantially the same as the second and third light sources 33 and 35 respectively shown in FIGS. 2 and 4.

The lightings from the light sources according to the exemplary embodiment of the present disclosure provide the light that best matches the McCree curve using lights having different spectra from each other, and particularly, the lightings provide a light of a spectrum having an area overlap ratio of at least 50% or at least 70%.

As described above, the light sources according to the exemplary embodiment of the present disclosure may be combined in various forms, and the form of the combination should not be limited to those described above. For example, the light sources according to the exemplary embodiment of the present disclosure may include at least two light sources among the first to third light sources or at least three light sources among the first through fourth light sources. For example, the light sources may include all the first through fourth light sources. As another example, the light sources may include the first, third, and fourth light sources. In the case where two or more light sources among the first through fourth light sources are combined with each other, the overlap area between the spectrum of the light emitted from the light sources and the spectrum defined by the McCree curve may be about 70% or more as compared with the spectrum defined by the McCree curve. As described above, the spectrum of the mixed light obtained by mixing two or more lights of the first through fourth lights maximizes the area where the spectrum of the mixed light overlaps the McCree curve, and thus the light efficiency may increase above about 3.1 µmol/J. Thus, it is possible to efficiently grow the plants with a small number of light sources, and energy and cost may be reduced.

In the present exemplary embodiment, at least one light source among the first to fourth light sources may include a plurality of light emitting elements.

The light source according to the exemplary embodiment of the present disclosure may be used for plant cultivation, and in detail, the light source may be applied to a plant cultivation device or a green house in which a light source is installed.

Figure 10:
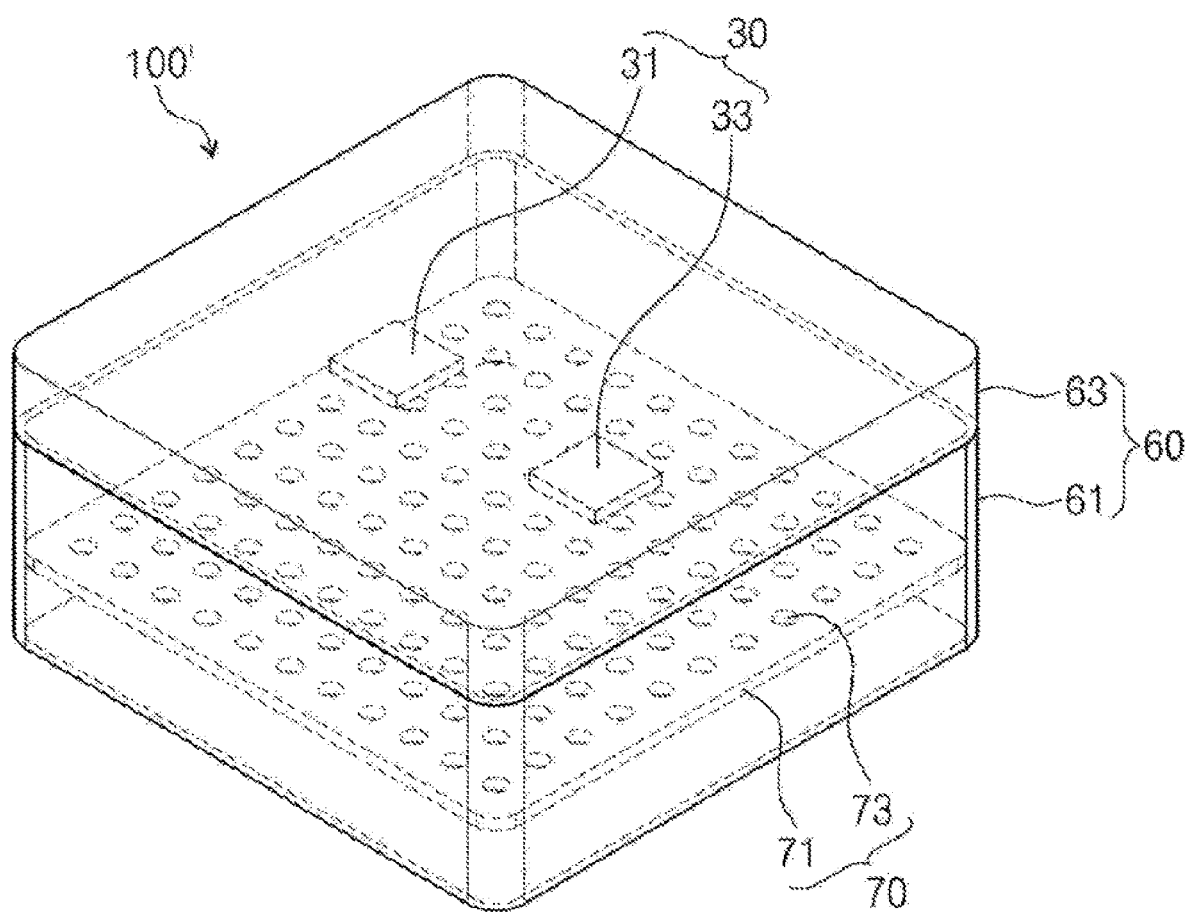
FIG. 10 is a perspective view conceptually showing a cultivation device according to an exemplary embodiment of the present disclosure.

FIG. 10 is a perspective view conceptually showing a cultivation device according to an exemplary embodiment of the present disclosure. The cultivation device shown in FIG. 10 corresponds to a small-sized cultivation device, but it should not be limited thereto or thereby.

Referring to FIG. 10, the cultivation device 100' according to the exemplary embodiment of the present disclosure includes a housing 60 having an inner space capable of growing plants and a light source 30 provided in the housing 60 to emit a light.

The housing 60 provides an empty space therein within which plants may be provided and may be grown. The housing 60 may be provided in a box shape that is capable of blocking an external light. In the exemplary embodiment of the present disclosure, the housing 60 may include a lower case 61 opened upward and an upper case 63 opened downward. The lower case 61 and the upper case 63 may be coupled to each other to form the box shape that blocks the external light.

The lower case 61 includes a bottom portion and a sidewall portion extending upward from the bottom portion. The upper case 63 includes a cover portion and a sidewall portion extending downward from the cover portion. The sidewall portions of the lower case 61 and the upper case 63 may have structures engaged with each other. The lower case 61 and the upper case 63 may be coupled to each other or separated from each other depending on a user's need, and thus a user may open or close the housing 60.

The housing 60 may be provided in various shapes. For example, the housing 60 may have a substantially rectangular parallelepiped shape or may have a cylindrical shape. However, the shape of the housing 60 should not be limited thereto or thereby, and the housing 60 may be provided in other shapes.

The housing 60 provides an environment in which the plants provided therein may be grown. The housing 60 may have a size that is capable of accommodating a plurality of plants provided and grown therein. In addition, the size of the housing 60 may be changed depending on a use of the plant cultivation device 100'. For example, in a case where the plant cultivation device 100' is used for a small-scale plant cultivation for the purpose of in-home use, the size of the housing 60 may be relatively small. In a case where the plant cultivation device 100' is used for commercial plant cultivation, the size of the housing 60 may be relatively large.

In the present exemplary embodiment of the present disclosure, the housing 60 may block the light such that the external light is not incident into the housing 60. Accordingly, a dark room environment, which is isolated from the outside, may be provided inside the housing 60. Therefore, the external light may be prevented from being unnecessarily irradiated to the plants provided inside the housing 60. In particular, the housing 60 may prevent an external visible light from being irradiated to the plants. Alternatively, or additionally, the housing 60 may be designed to be partially open depending on needs in order to receive the external light.

In the present exemplary embodiment, the space inside the housing 60 may be provided as a whole space. However, this is for the convenience of explanation only, and the space inside the housing 60 may be divided into a plurality of compartments. That is, partition walls may be provided in the housing 60 to divide the space inside the housing 60 into plural compartments.

The light source provides the light to the plants in the space of the housing 60. The light source is disposed on an inner surface of the upper case 63 or the lower case 61. In the exemplary embodiment of the present disclosure, the light source may be disposed on the cover portion of the upper case 63. In the present exemplary embodiment, the light source disposed on an inner surface of the cover portion of the upper case 63 is shown: however, it should not be limited thereto or thereby. For example, according to another embodiment of the present disclosure, the light source may be disposed on the sidewall portion of the upper case 63. In addition, according to another embodiment of the present disclosure, the light source may be disposed on the sidewall portion of the lower case 61, e.g., on an upper end of the sidewall portion. Further, according to another embodiment of the present disclosure, the light source may be disposed on at least one of the cover portion of the upper case 63, the sidewall portion of the upper case 63, and the sidewall portion of the lower case 61.

A culture platform 70 may be provided in the space of the housing 60 to cultivate the plant easily, for example, for facilitating a hydroponic culture. The culture platform 70 may include a plate-shaped plate 71 disposed at a position spaced apart upward from the bottom portion of the housing 60. A through-hoes 73 with a uniform size may be provided through the plate 71. The culture platform 70 may be provided to allow plants to be grown on an upper surface of the plate 71 and may include a plurality of through-holes 73 to allow water supplied thereto to be drained when the water is supplied. The through-hole 73 may be provided in a size such that plants do not slip through. For example, the through-hole 73 may have a diameter smaller than plants. A space between the culture platform 70 and the bottom portion of the lower case 61 may serve as a water tank in which the drained water is stored. Accordingly, water drained downward through the through-hole 73 of the culture platform 70 may be stored in the space between the bottom portion of the lower case 61 and the culture platform 70.

However, according to the exemplary embodiment of the present disclosure, plants may also be cultivated by methods other than the hydroponic culture method. In this case, water, a culture medium, and soil may be provided in the space of the housing 60 to supply the water and/or nutrients necessary for the plants, and the housing 60 may serve as a container. The culture medium or the soil may contain the nutrients for plants to grow, such as potassium (K), calcium (Ca), magnesium (Mg), sodium (Na), and iron (Fe). Plants may be provided while being imbedded in the culture medium or may be placed on a surface of the culture medium depending on its type.

The culture platform 70 may have a size and a shape, which vary depending on the shape of the housing 60 and the manner that a first light source and a second light source are provided. The size and the shape of the culture platform 70 may be configured to allow plants provided on the culture platform 70 to be placed within an irradiation range of the light irradiated from the first light source and the second light source.

The housing 60 may include a water supply unit disposed therein to supply water to the plants. The water supply unit may be configured to be disposed at an upper end of the housing 60, e.g., on the inner surface of the cover portion of the upper case 63, and to spray water onto the culture platform 70. However, the configuration of the water supply unit should not be limited thereto or thereby, and the configuration of the water supply unit may vary depending on the shape of the housing 60 and the arrangement of the culture platform 70. In addition, the user may directly supply water into the housing 60 without a separate water supply unit.

One or more of the water supply units may be provided. The number of the water supply units may vary depending on the size of the housing 60. For instance, in the case of the relatively small-sized plant cultivation device for in-home use, a single water supply unit may be used since the size of the housing is small. In the case of the relatively large-sized commercial plant cultivation device, plural water supply units may be used since the size of the housing 60 is large. However, the number of the water supply units should not be limited thereto or thereby, and the water supply unit may be provided in a variety of positions in various numbers.

The water supply unit may be connected to a water tank provided in the housing 60 or a faucet outside the housing 60. In addition, the water supply unit may further include a filtration unit such that contaminants floating in water are not provided to the plants. The filtration unit may include a filter, such as an activated carbon filter or a non-woven fabric filter, and thus water passing through the filtration unit may be purified. The filtration unit may further include a light irradiation filter. The light irradiation filter may remove germs, bacteria, fungal spores, and the like, which are present in water, by irradiating an ultraviolet light or the like to the water. As the water supply unit includes the above-mentioned filtration unit, there is no possibility that the inside of the housing 60 and plants are contaminated even when the water is recycled or rainwater or the like is directly used for the cultivation.

Water provided from the water supply unit may be provided as plain water itself (for example, purified water) without additional nutrients: however, it should not be limited thereto or thereby, and the water provided from the water supply unit may contain nutrients necessary for the growth of the plant. For example, water may contain a material, such as potassium (K), calcium (Ca), magnesium (Mg), sodium (Na), and iron (Fe), and a material, such as nitrate, phosphate, sulfate, and chloride (CI). For instance, Sachs's solution, Knop's solution, Hoagland's solution, or Hewitt's solution may be supplied from the water supply unit.

According to the exemplary embodiment, plants may be cultivated using a light source.

A plant cultivation method according to an exemplary embodiment of the present disclosure may include germinating a plant and providing light in the visible light wavelength band to the germinated plant. The light provided to the plants is emitted from the light sources according to the above-described embodiments, and the light in the visible light wavelength band may include at least two or three lights among first, second, third, and fourth lights having different light spectra from each other.

Although the exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed.

Therefore, the disclosed subject matter should not be limited to any single embodiment described herein, and the scope of the present inventive concept shall be determined according to the attached claims.

I claim:

1. A device for providing light, comprising:
   a substrate;
   a first light source disposed on the substrate and configured to emit, to a plant, a first light having a first peak at a wavelength from about 400 nm to about 500 nm and a first sub-peak having a full-width at half-maximum greater than a full-width at half-maximum of the first peak; and
   a second light source disposed on the substrate and configured to emit, to the plant, a second light having a second peak at a wavelength from about 500 nm to about 700 nm, the second peak having an intensity greater than an intensity of the first sub-peak of the first light, and
   wherein the first sub-peak and the second peak are located at different wavelengths from each other in spectrums of the first light and the second light,
   wherein a spectrum of a combined light obtained by mixing the first light and the second light only has a first valley between the first peak and the first sub-peak and a second valley between the first peak and the second peak such that the first valley and the second valley do not overlap with each other and the light is provided to plants in regions corresponding to the first valley and the second valley.

2. The device of claim 1, wherein a combination of the first light of and the second light that is provided to the plant has a lower intensity in the first peak as compared to a case when the first light is combined with a third light having a third peak at the wavelength from about 400 nm to about 500 nm.

3. The device of claim 1, further comprising a controller communicatively coupled to the first light source and the second light source and configured to control signals to control the first light source and the second light source.

4. The device of claim 1, further comprising a power supply configured to supply a power to the first light source and the second light source.

5. The device of claim 1, wherein the first light source is configured to emit the first light including a portion of a blue color and the second light source is configured to emit the second light including a portion of a red color.

6. The device of claim 1, wherein the first light has a color temperature of about 5000 K.

7. The device of claim 1, wherein an overlap area between a spectrum of the first light and the second light and a spectrum defined by a McCree curve is equal to or greater than the spectrum defined by the McCree curve by about 50%.

8. The device of claim 1, wherein a spectrum of the first light has a valley between the first peak and the first sub-peak.

9. The device of claim 1, wherein the second light has a second sub-peak at a wavelength less than 700 nm and an intensity of the second sub-peak is lower than the intensity of the second peak.

10. A device for providing light, comprising:
first light sources disposed on a substrate, each first light source configured to emit, to a plant, a first light having a first peak at a wavelength from about 400 nm to about 500 nm and a first sub-peak having a full-width at half-maximum greater than a full-width at half-maximum of the first peak; and
second light sources disposed on the substrate, each second light source configured to emit, to the plant, a second light having a second peak at a wavelength from about 500 nm to about 700 nm, the second peak having an intensity greater than an intensity of the first sub-peak of the first light, and
wherein, in a spectrum of the first light and a spectrum of the second light, spectral positions of the first sub-peak and the second peak do not match with each other, and
wherein a number of the second light sources is different from the number of the first light sources,
wherein a spectrum of a combined light obtained by mixing the first light and the second light only has a first valley between the first peak and the first sub-peak and a second valley between the first peak and the second peak such that the first valley and the second valley do not overlap with each other and the light is provided to plants in regions corresponding to the first valley and the second valley.

11. The device of claim 10, wherein a combination of the first light of and the second light that is provided to the plant has a lower intensity in the first peak as compared to a case when the first light is combined with a third light having a third peak at the wavelength from about 400 nm to about 500 nm.

12. The device of claim 10, further comprising a controller communicatively coupled to the first light sources and the second light sources and configured to control the first light sources and the second light sources.

13. The device of claim 10, further comprising a power supply configured to supply a power to the first light sources and the second light sources.

14. The device of claim 10, wherein each first light source is configured to emit the first light including a portion of a blue color and each second light source is configured to emit the second light including a portion of a red color.

15. The device of claim 10, wherein the first light has a color temperature of about 5000 K.

16. The device of claim 10, wherein an overlap area between a spectrum of the first light and the second light and a spectrum defined by a McCree curve is equal to or greater than the spectrum defined by the McCree curve by about 50%.

17. The device of claim 10, wherein a spectrum of the first light has a valley between the first peak and the first sub-peak.

18. The device of claim 10, wherein the second light has a second sub-peak at a wavelength less than 700 nm and an intensity of the second sub-peak is lower than the intensity of the second peak.

* * * * *